United States Patent [19]

Kobayashi et al.

[11] Patent Number: 4,592,315
[45] Date of Patent: Jun. 3, 1986

[54] CONTROL DEVICE OF AN INTERNAL COMBUSTION ENGINE

[75] Inventors: Nobuyuk Kobayashi; Takashi Hattori; Toshimitsu Ito, all of Toyota, Japan

[73] Assignee: Toyota Jidosha Kabushiki Kaisha, Toyota, Japan

[21] Appl. No.: 730,577

[22] Filed: May 6, 1985

[30] Foreign Application Priority Data

May 7, 1984 [JP] Japan .................................. 59-91591

[51] Int. Cl.$^4$ .............................................. F01L 3/00
[52] U.S. Cl. ........................... 123/188 M; 123/188 S; 123/416; 123/308
[58] Field of Search ................ 123/188 M, 188 S, 416, 123/432, 308, 52 M

[56] References Cited

U.S. PATENT DOCUMENTS

| | | | |
|---|---|---|---|
| 4,411,226 | 10/1983 | Okumura et al. | 123/188 M |
| 4,438,741 | 3/1984 | Okumura et al. | 123/188 M |
| 4,485,775 | 12/1984 | Kanada et al. | 123/188 M |
| 4,503,822 | 3/1985 | Kobayashi et al. | 123/416 |
| 4,527,519 | 7/1985 | Oonaka et al. | 123/188 M |

FOREIGN PATENT DOCUMENTS

| | | | |
|---|---|---|---|
| 58-143108 | 8/1983 | Japan . | |
| 58-204928 | 11/1983 | Japan | 123/188 M |
| 59-10736 | 1/1984 | Japan | 123/188 M |

*Primary Examiner*—E. Rollins Cross
*Attorney, Agent, or Firm*—Cushman, Darby & Cushman

[57] ABSTRACT

Disclosed is an engine having a swirl control valve in the intake port. When the engine is operating under a partial load, a lean air-fuel mixture is fed into the engine cylinders, and the swirl control valve is closed in order to create a swirl motion in the combustion chamber. When the throttle valve is fully open, a rich air-fuel mixture is fed into the engine cylinders, and the swirl control valve is closed. In addition, the ignition timing is retarded. After this, when the throttle valve is slightly closed, the swirl control valve is maintained at the open position, and the air-fuel mixture of an approximately stoichiometric air-fuel ratio is fed into the engine cylinders. At the same time, the ignition timing is slightly advanced.

16 Claims, 16 Drawing Figures

CONTROL DEVICE OF AN INTERNAL COMBUSTION ENGINE

BACKGROUND OF THE INVENTION

1. Field of Invention

The present invention relates to a control device of an internal combustion engine.

2. Description of the Related Art

U.S. Pat. No. 4,485,775 discloses an engine having a helically-shaped intake port, which can create a strong swirl motion in the combustion chamber when the engine is operating at a low speed and obtain a high volumetric efficiency when the engine is operating at a high speed. This helically-shaped intake port includes a helical portion, an inlet passage portion tangentially connected to the helical portion, and a bypass passage connecting the inlet passage portion to the helix terminating portion of the helical portion. A swirl control valve actuated by an actuator is arranged in the bypass passage. The actuator includes a vacuum chamber and an atmospheric pressure chamber, these chambers being separated by a diaphragm. This diaphragm is connected to the swirl control valve. The vacuum chamber of the actuator is connected to the intake manifold via a check valve, which permits only the outflow of air from the vacuum chamber to the intake manifold.

When the engine is operating under a heavy load, the vacuum chamber of the actuator is opened to the outside air so that the swirl control valve opens the bypass passage to the maximum extent. Contrary to this, when the engine is operating under a light load, the vacuum chamber of the actuator is disconnected from the outside air and connected to only the intake manifold via the check valve.

When the engine is operating under a light load, a large vacuum is produced in the intake manifold. At this time, since the check valve opens a large vacuum is also produced in the vacuum chamber and, as a result, the swirl control valve closes the bypass passage. The entire air flows into the helical portion from the inlet passage portion of the intake port, and thus a strong swirl motion is created in the combustion chamber.

However, where the diaphragm type actuator is used for actuating the swirl control valve, hysteresis occurs in the operation of the actuator. That is, once the swirl control valve closes, even if the level of the vacuum in the vacuum chamber becomes relatively low, it is possible to maintain the swirl control valve at the closed position. However, to close the swirl control valve, it is necessary to induce a large vacuum in the vacuum chamber of the actuator. In the above-mentioned engine, when the engine load exceeds a predetermined level, the vacuum chamber of the actuator is opened to the outside air, thereby opening the swirl control valve. In this case, even if the level of vacuum produced in the vacuum chamber immediately before the vacuum chamber is opened to the outside air is relatively low, it is possible to maintain the swirl control valve at the closed position immediately before the engine load exceeds the predetermined level.

Contrary to this, in the above-mentioned engine, when the engine load decreases below the predetermined level, the vacuum chamber of the actuator is disconnected from the outside air and connected to only the intake manifold via the check valve. At this time, the level of vacuum in the vacuum chamber of the actuator becomes approximately equal to that of the vacuum in the intake manifold. However, at this time, the level of vacuum in the intake manifold is relatively low and, therefore, the level of vacuum in the vacuum chamber of the actuator is also relatively low. Nevertheless, as mentioned above, a large vacuum is necessary for closing the swirl control valve due to the hysteresis of the actuator. Consequently, in the above-mentioned engine, a problem occurs in that it is impossible to instantaneously close the swirl control valve when the engine load decreases below the predetermined level.

In an engine using an air-fuel mixture having an approximately stoichiometric air-fuel ratio, if the swirl control valve does not instantaneously close when the engine load decreases below the predetermined level, no particular problem occurs. However, in an engine using an extremely lean air-fuel mixture, when the engine load is lower than the predetermined level and using a rich air-fuel mixture when the engine load is higher than the predetermined level, if the swirl control valve does not close when the engine load decreases below the predetermined level, a swirl motion is not created in the combustion chamber when the engine load decreases below the predetermined level. However, when the engine load decreases below the predetermined level, the air-fuel mixture fed into the engine cylinders is changed from a rich air-fuel mixture to an extremely lean air-fuel mixture. Nevertheless, at this time, since a swirl motion is not created in the combustion chamber, the combustion deteriorates. Consequently, when the engine load decreases below the predetermined level, the output torque of the engine is considerably reduced, and thus a problem occurs in that good drivability cannot be obtained.

Of course, it is possible to eliminate such a problem by using an actuator which operates by a small vacuum. However, if such an actuator is adopted, a diaphragm having large size is necessary, and thus the size of the actuator becomes large. However, it is difficult to arrange an actuator having a large size in the engine compartment and, therefore, such an actuator cannot be adopted in practice.

SUMMARY OF THE INVENTION

An object of the present invention is to provide a control device of an internal combustion engine, which is capable of obtaining a good drivability when the engine operating state is changed from the heavy load operating state to the partial load operating state.

According to the present invention, there is provided a control device of an internal combustion engine, comprising: an intake passage; a throttle valve arranged in the intake passage; and switch means operated in response to the degree of opening of the throttle valve and producing an output signal representing the state wherein the degree of opening of the throttle valve is greater than a predetermined degree.

A vacuum sensor is arranged in the intake passage and produces an output signal representing the absolute pressure therein, and discriminating means operated in response to the output signals of the switch means and the vacuum sensor is provided for discriminating whether the absolute pressure decreases by a predetermined pressure after the degree of opening of the throttle valve becomes smaller than the predetermined degree to produce an output signal representing the state wherein, the absolute pressure decreases by the predetermined pressure after the degree of opening of the throttle valve become smaller than the predetermined degree.

A swirl control valve is arranged in the intake passage for creating a swirl motion in a combustion chamber when the swirl control valve is closed and a valve control means is provided for actuating the swirl control valve in response to the output signals of the switch means and the discriminating means for opening the swirl control valve when the degree of opening of the throttle valve exceeds the predetermined degree and for closing the swirl control valve when the absolute pressure decreases by the predetermined pressure after the degree of opening of the throttle valve becomes smaller than the predetermined degree. A fuel supply means is arranged in the intake passage for normally forming a lean air-fuel mixture therein, and a fuel supply control means is provided for controlling the fuel supply means in response to the output signals of the switch means and the discriminating means for forming a rich air-fuel mixture in the intake passage when the degree of opening of the throttle valve exceeds the predetermined degree and for forming in the intake passage an air-fuel mixture having an intermediate air-fuel ratio between an air-fuel ratio of the lean air-fuel mixture and an air-fuel ratio of the rich air-fuel mixture until the time that the absolute pressure decreases by the predetermined pressure after the degree of opening of the throttle valve becomes smaller than the predetermined degree.

A spark plug is arranged in the combustion chamber and normally produces a spark at a predetermined basic ignition timing, and an ignition timing control means is provided for controlling the ignition timing of the spark plug in response to the output signals of the switch means and the discriminating means for retarding the ignition timing when the degree of opening of the throttle valve exceeds the predetermined degree and for changing the ignition timing to an intermediate ignition timing between the basic ignition timing and the retarded ignition timing until the time that the absolute pressure decreases by the predetermined pressure after the degree of opening of the throttle valve becomes smaller than the predetermined degree.

BRIEF DESCRIPTION OF THE DRAWINGS

The present invention may be more fully understood from the description of a preferred embodiment of the invention set forth below, together with the accompanying drawings, in which.

DESCRIPTION OF THE PREFERRED EMBODIMENT

Figure 1:
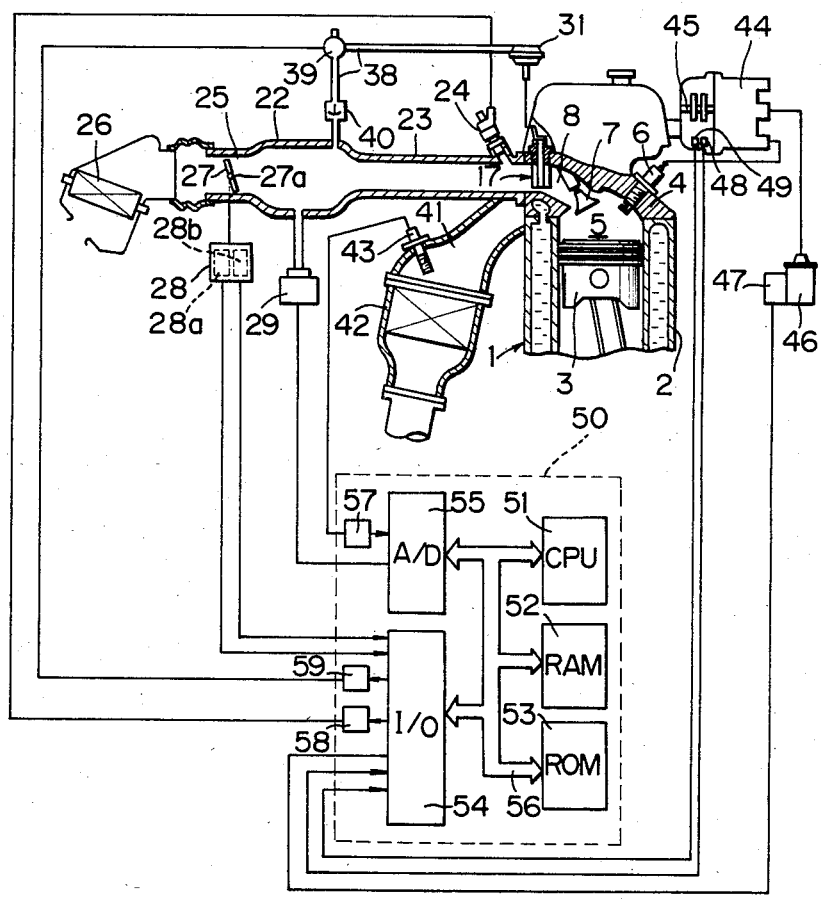
FIG. 1 is a cross-sectional side view of an entire engine.
Figure 2:
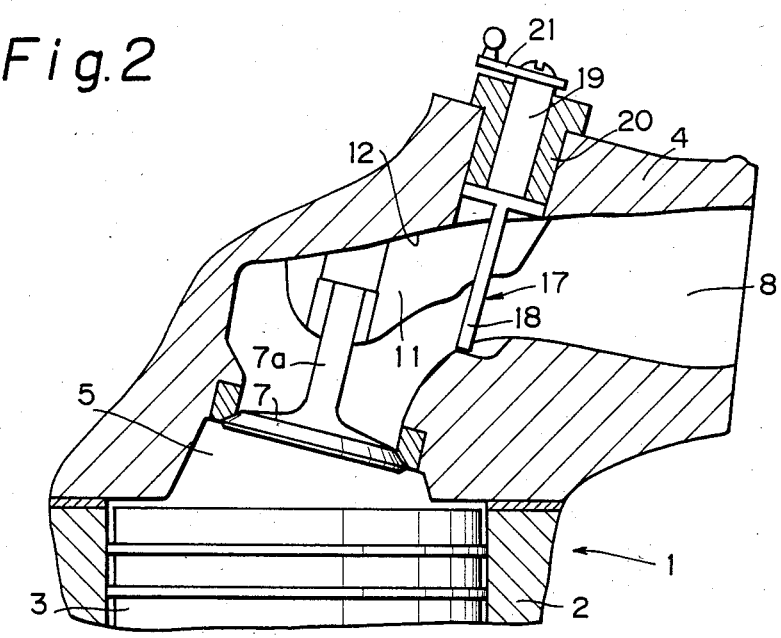
FIG. 2 is a cross-sectional side view of the cylinder head.
Figure 3:
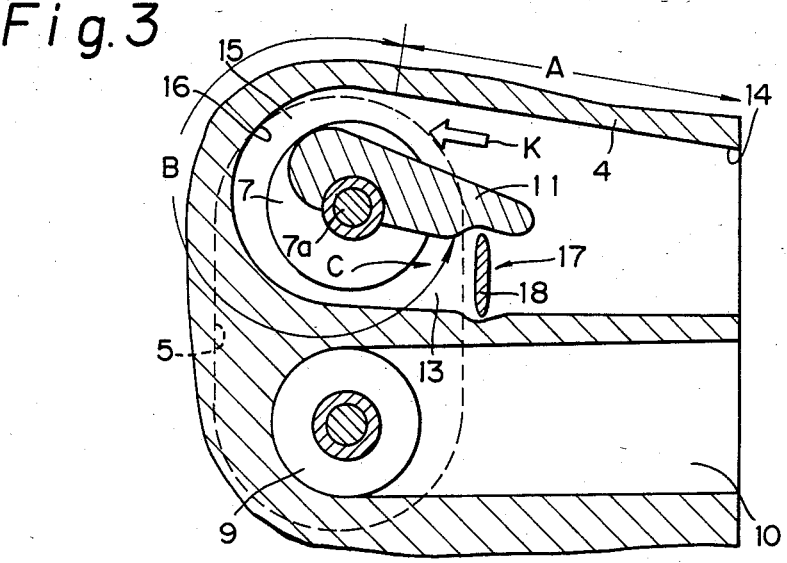
FIG. 3 is a cross-sectional plan view of the cylinder head.
Figure 4:
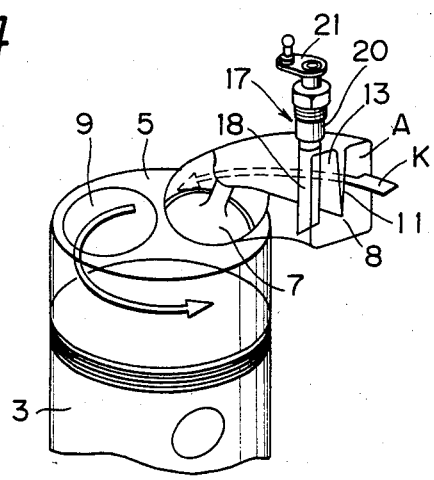
FIG. 4 is a schematically illustrated perspective view of the engine.

Referring to FIGS. 1 through 4, reference numeral 1 designates an engine body, 2 a cylinder block, 3 a piston reciprocally movable in the cylinder block 2, and 4 a cylinder head fixed to the cylinder block 2; 5 designates a combustion chamber, 6 a spark plug arranged in the combustion chamber 5, 7 an intake valve, and 8 a helically-shaped intake port; 9 designates an exhaust valve, and 10 an exhaust port. A downwardly projecting separating wall 11 is formed on the upper wall 12 of the intake port 8, and a space is formed between the lower face of the separating wall 11 and the bottom wall of the intake port 8. This separating wall 11 passes the side of the valve stem 7a and extends along the axis of the intake port 8. An inlet passage portion A, a helical portion B, and a bypass passage 13 are formed in the intake port 8 by the separating wall 11. The inlet passage portion A is tangentially connected to the helical portion B, and the bypass passage 13 is branched from the inlet passage portion A and connected to the helix terminating portion C of the helical portion B. As illustrated in FIG. 3, the transverse width of the inlet passage portion A formed between the side wall 14 of the intake port 8 and the separating wall 11 decreases toward the helical portion B, and a narrow passage portion 15 is formed between the cylindrical side wall 16 of the helical portion B and the separating wall 11. A swirl control valve 17 is arranged in the bypass passage 13. This swirl control valve 17 includes a thin walled valve body 18 and a valve shaft 19; the valve shaft 19 being rotatably supported by a valve holder 20 fixed onto the cylinder head 4. As illustrated in FIG. 2, an arm 21 is fixed onto the upper end of the valve shaft 19.

Figure 7:
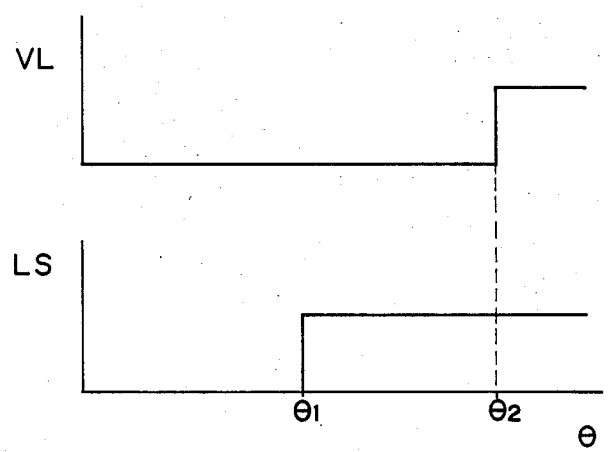
FIG. 7 is a diagram illustrating the output signals of the fully open switch and the lean switch.

As illustrated in FIG. 1, the intake port 8 is connected to a surge tank 22 via a branch pipe 23, and fuel injector 24 is arranged in the branch pipe 23. This fuel injector 24 is connected to a fuel pump (not shown) driven by the engine. The surge tank 22 is connected to the outside air via an intake air duct 25 and air filter element 26, and a throttle valve 27 actuated in response to the depression of the accelerator pedal (not shown) is arranged in the intake air duct 26. A throttle sensor 28 is connected to the valve shaft 27a of the throttle valve 27. This throttle sensor 28 includes a lean switch 28a and a fully open switch 28b therein. The lean switch 28a is made ON when the degree of opening 8 of the throttle valve 27 exceeds a predetermined degree, for example, 20 degrees through 30 degrees as illustrated by LS in FIG. 7. The fully open switch 28b is made ON when the degree of opening θ of the throttle valve 27 exceeds a predetermined degree, for example, 50 degrees, that is, when the throttle valve 27 is fully open as illustrated by VL in FIG. 7. The lean switch 28a and the fully open switch 28b are connected to an electronic control unit 50.

A vacuum sensor 29 is attached to the surge tank 22 and produces an output voltage which is proportional to the absolute pressure produced in the surge tank 22. This vacuum sensor 29 is connected to the electronic control unit 50.

Figure 5:
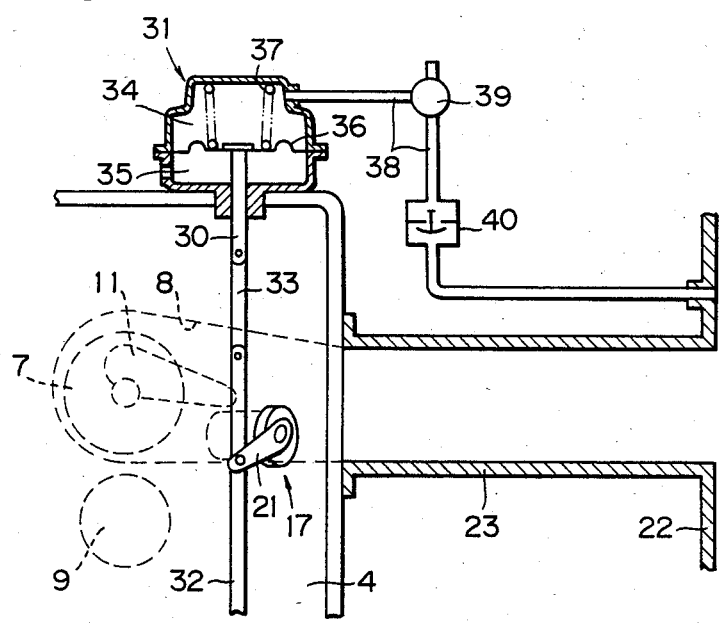
FIG. 5 is plan view, partly in cross-section, of a portion of the cylinder head.

As illustrated in FIGS. 1 and 5, the arm 21 of the swirl control valve 17 is connected to a control rod 30 of an actuator 31 via a connecting rod 32 and a link member 33. The actuator 31 includes a vacuum chamber 34 and an atmospheric pressure chamber 35, which chambers are separated by a diaphragm 36. The control rod 30 is connected to the diaphragm 36, and a compression spring 37 for biasing the diaphragm is arranged in the vacuum chamber 34. The vacuum chamber 35 is connected to the surge tank 22 via a conduit 38. A solenoid valve 39, which can be opened to the outside air, is arranged in the conduit 38 and, in addition, a check valve 40 which permits only the outflow of air from the vacuum chamber 34 to the surge tank 22 is arranged in the conduit 22. The solenoid valve 39 is connected to the electronic control unit 50 and is controlled in response to the output signal of the electronic control unit 50.

When the vacuum chamber 34 of the actuator 31 is connected to the surge tank 22 via the solenoid valve 39, a vacuum acts in the vacuum chamber 34. At this time, the check valve 40 opens only when the level of vacuum in the surge tank 22 is greater than the level of vacuum in the vacuum chamber 34. Consequently, the level of vacuum in the vacuum chamber 34 is maintained at the maximum vacuum produced in the surge tank 22. When the level of vacuum in the vacuum chamber 34 exceeds a predetermined level, the diaphragm 36 moves toward the vacuum chamber 34 and, as a result, the swirl control valve 17 closes the bypass passage 13, as illustrated in FIG. 3. At this time, air introduced into the inlet passage portion A of the intake port 8 flows into the helical portion B, as illustrated by the arrow K in FIGS. 3 and 4. Then, since the inlet passage portion A is formed in such a manner that the transverse width thereof decreases toward the helical portion B, as mentioned above, the velocity of the air is increased. Accordingly, the air flows along the cylindrical side wall 16 of the helical portion B, and thus a strong swirl motion is created.

When the vacuum chamber 34 of the actuator 31 is opened to the outside air via the solenoid valve 39, the diaphragm 36 is moved toward the atmospheric pressure chamber 35 by the spring force of the compression spring 37. As a result, the swirl control valve 17 opens the bypass passage 13. Consequently, at this time, part of the air flows into the helical portion B via the bypass passage 13 having a small flow resistance. This part of the air comes into head-on collision with the air stream swirling along the cylindrical side wall 16 of the helical portion B, and thus the swirl motion is weakened. As mentioned above, when the swirl control valve 17 is open to the maximum extent, the swirl motion is weakened and, in addition, the flow area of the intake port 8 is increased. As a result, a high volumetric efficiency can be obtained.

Figure 6:
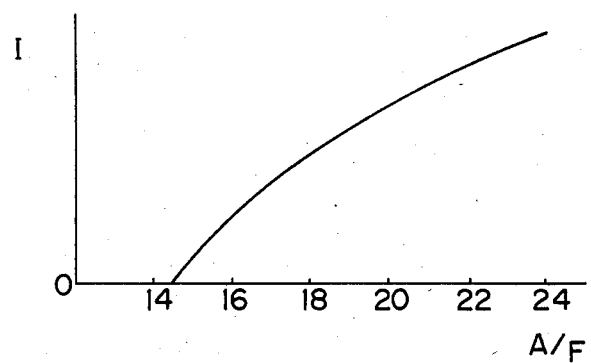
FIG. 6 is a diagram illustrating the output current of a lean sensor.

Referring to FIG. 1, an exhaust manifold 41 is connected to the exhaust port 10 (FIG. 3), and a catalytic converter 42 containing a catalyzer therein is connected to the exhaust manifold 41. Hydro-carbons (HC), carbon-monoxide (CO), and nitrogen-oxides (NOx) are purified in the catalytic convertor 42. A lean sensor 43 is arranged in the exhaust manifold 41 and connected to the electronic control unit 50. The lean sensor 43 produces an output current which is proportional to the oxygen concentration in the exhaust gas, as illustrated in FIG. 6. In FIG. 6, the ordinate indicates the output current I of the lean sensor 43, and the abscissa indicates the air-fuel ratio (A/F). The construction and operation of the lean sensor 43 is known (for example, Japanese Unexamined Patent Publication (Kokai) No. 58-143108) and, therefor, a description of the construction and the operation of the lean sensor 43 is omitted.

As illustrated in FIG. 1, the engine 1 is equipped with a distributor 44 having a rotor 45 driven by the engine 1. The distributor 44 is connected to the electronic control unit 50 via an ignition coil 46 and an igniter 47. The electronic control unit 50 produces an ignition signal. The ignition signal is fed into the igniter 47 and the primary current of the ignition coil 46 is controlled by this ignition signal. The high voltage produced in the ignition coil 46 is applied to the spark plug 6 at each cylinder via the distributor 44, and thus the spark plug 6 produces a spark at a time determined by the ignition signal. A pair of crank angle sensors 48, 49 are arranged in the distributor 44 and connected to the electronic control unit 50. The crank angle sensor 48 produces an output pulse every time the crank shaft of the engine 1 rotates by 30 degrees, and the crank angle sensor 49 produces an output pulse every time the crankshaft of the engine 1 rotates by 720 degrees.

The electronic control unit 50 is constructed as a digital computer and includes a control processing unit (CPU) 51 carrying out the arithmetic and logic processing, a random-access memory (RAM) 52, a read-only memory (ROM) 53 storing a predetermined control program and arithmetic constant therein, an input/output (I/O) unit 54, and an analog-digital (A/D) converter 55 incorporating a mutiplexer. The CPU 51, the RAM 52, the ROM 53, the I/O port 54, and the A/D converter 55 are interconnected to each other via a bidirectional bus 56. The lean switch 28a and the fully open switch 28b are connected to the I/O port 54, and the output signals of the lean switch 28a and the fully open switch 28b are input to the I/O port 54. The vacuum sensor 29 is connected to the A/D converter 55, and the output signal of the vacuum sensor 29 is input to the A/D converter 55. The lean sensor 43 is connected to the A/D converter 55 via a current-voltage converting circuit 57 of the electronic control unit 50. The output current of the lean sensor 43 is converted to a corresponding voltage in the current-voltage converting circuit 57, and the voltage thus converted is then input to the A/D converter 55. In the A/D converter 55, the output voltage of the vacuum sensor 29 or the output voltage of the current-voltage converting circuit 57 is selectively converted to a corresponding binary code in response to the indication signal issued from the CPU 51. The binary code thus obtained, that is, data representing the absolute pressure PM in the surge tank 22 and data corresponding to the output current LNSR of the lean sensor 42, is stored in the RAM 52.

The crank angle sensors 48 and 49 are connected to the I/O port 54, and the output pulses of the crank angle sensors 48 and 49 are input to the I/O port 54. These output pulses are then input to the CPU 51 and, for example, the engines speed NE is calculated by measuring the number of output pulses which the crank angle sensor 48 produces per unit time. The thus calculated engine speed NE is then stored in the RAM 52.

The fuel injector 24 and the solenoid valve 39 are connected to the I/O port 54 via corresponding drive circuits 58 and 59, and the igniter 47 is connected to the I/O port 54. An injection signal is fed into the fuel injector 24 from the CPU 51 via the I/O port 54 and the drive circuit 58. The solenoid of the fuel injector 24 is energized for a time period determined by the injection signal, and thus fuel is intermittently injected from the fuel injector 24 into the intake port 8. A swirl control drive signal is fed into the solenoid valve 39 from the CPU 51 via the I/O port 54 and the drive circuit 59, and the solenoid valve 39 is energized for a time period determined by the swirl control drive signal. As mentioned previously, the ignition signal is fed into the igniter 47 from the CPU 51 via the I/O port 54.

In the engine according to the present invention, three kinds of air-fuel mixtures, that is, an extremely lean air-fuel mixture (for example, air-fuel ratio of about 22:1), a relatively lean air-fuel mixture (for example, air-fuel ratio of 17:1 through 18:1), and a rich air-fuel mixture are used. Roughly speaking, when the throttle valve 27 is fully open, the rich air-fuel mixture is fed into the engine cylinders, and when the engine is operating under a partial load, the extremely lean air-fuel mixture or the relatively lean air-fuel mixture is fed into the engine cylinders. At this time, it is determined by the position of the throttle valve 27 whether the extremely lean air-fuel mixture of the relatively lean air-fuel mixture should be fed into the cylinders. That is, when the lean switch 28a is made ON, i.e., when the degree of opening of the throttle valve 27 is greater than a predetermined degree, for example, 20 degrees to 30 degrees, but the throttle valve 27 is not fully open, the relatively lean air-fuel mixture is fed into the cylinders. Contrary to this, when the lean switch 28a is made OFF, that is, when the degree of opening of the throttle valve 27 becomes smaller than the predetermined degree, the extremely lean air-fuel mixture is fed into the cylinders. In addition, when the rich air-fuel mixture is fed into the cylinders, the swirl control valve 17 is opened to the maximum extent and, when the extremely lean air-fuel mixture or the relatively lean air-fuel mixture is fed into the cylinders, the swirl control valve 17 is closed. If the swirl control valve 17 is closed, a strong swirl motion is created in the combustion chamber 5 and, as a result, the burning velocity is increased. Consequently, at this time, even if the lean air-fuel mixture is fed into the cylinders, stable combustion can be obtained. The above-mentioned operation is a basic operation.

In the present invention, as hereinafter described, an air-fuel mixture having an intermediate air-fuel ratio between the rich air-fuel mixture and the lean air-fuel mixture, for example, an air-fuel mixture having an approximately stoichiometric air-fuel ratio, is fed into the engine cylinders shortly after the fully open switch 28b is made OFF. At this time, the swirl control valve 17 remains open, and the ignition timing is advanced.

Figure 8:
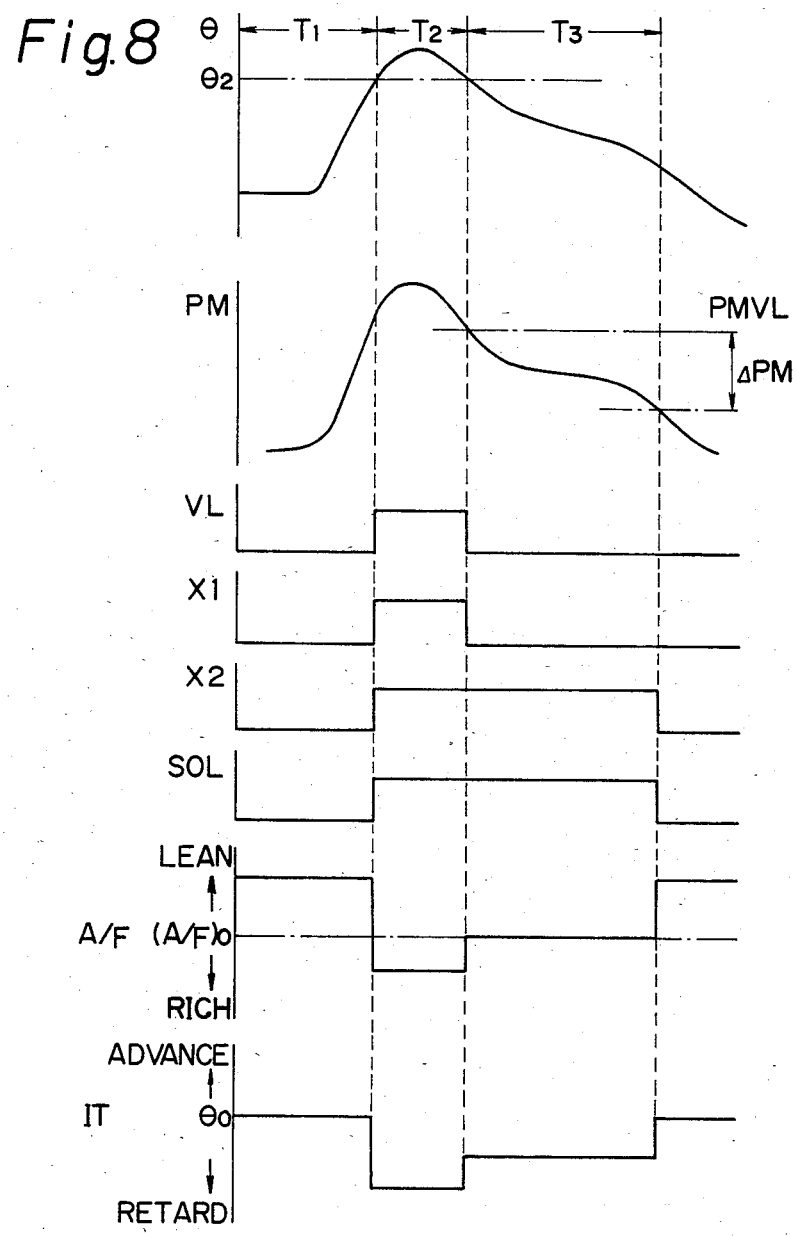
FIG. 8 is a time chart illustrating changes in a degree of opening of the throttle valve, an absolute pressure in the surge tank, flags, an air-fuel ratio, and an ignition timing.

FIG. 8 illustrates the degree of opening $\theta$ of the throttle valve 27, the absolute pressure PM in the surge tank 22, the output signal VL of the fully open switch 28b, the flag X1 used in the flow charts hereinafter described, the flag X2 used in the flow charts hereinafter described, the swirl control drive signal SOL fed into the solenoid valve 39, the air-fuel ratio A/F of mixture fed into the engine cylinders, and the ignition timing IT.

In FIG. 8, when the degree of opening $\theta$ of the throttle valve 27 exceeds a predetermined degree $\theta_2$, for example, 50 degrees, the fully open switch 28b is made ON. Consequently, in FIG. 8, the time period $T_1$ indicates where the fully open switch 28b is OFF, and the time period $T_2$ indicates where the fully open switch 28b is ON. In the time period $T_1$, the swirl control drive signal SOL is not produced. Consequently, at this time, the vacuum chamber 34 of the actuator 31 is connected to only the surge tank 22, and thus the swirl control valve 17 closes the bypass passage 13. In addition, at this time, the lean air-fuel mixture is fed into the engine cylinders, and the ignition timing is advanced.

If the fully open switch 28b is made ON in the time period $T_2$, the flags X1 and X2 are set and, at the same time, the swirl control drive signal SOL is produced. If the flag X1 is set, the air-fuel mixture fed into the engine cylinders is changed from the lean air-fuel mixture to a rich air-fuel mixture, and the ignition timing is considerably retarded. In addition, if the swirl control drive signal SOL is produced, that is, the solenoid valve 39 is energized, the vacuum chamber 34 of the actuator 31 is opened to the outside air and, as a result, the swirl control valve 17 opens the bypass passage 13 to the maximum extent.

Subsequently, when the fully open switch 28b is made OFF, the flag X1 is reset, but the flag X2 remains set. At this time, the air-fuel mixture fed into the engine cylinders is changed from the rich air-fuel mixture to the air-fuel mixture of an approximately stoichiometric air-fuel ratio (A/F), and the ignition timing is slightly advanced. In addition, at this time, the swirl control drive signal SOL remains produced, the vacuum chamber 34 of the actuator 31 remains open to the outside air, and the swirl control valve 17 opens the bypass passage 13 to the maximum extent.

Then, when the absolute pressure PM in the surge tank 22 decreases by $\Delta PM$, that is, when the time period $T_3$ has elapsed after the fully open switch 28b is made OFF, the flag X2 is reset. At this time, the air-fuel mixture fed into the engine cylinders is changed from the air-fuel mixture of an approximately stoichiometric air-fuel ratio to the lean air-fuel mixture, and the ignition timing is advanced. In addition, at this time, the production of the swirl control drive signal SOL is stopped, and thus the swirl control valve 17 closes the bypass passage 13.

Figure 9:
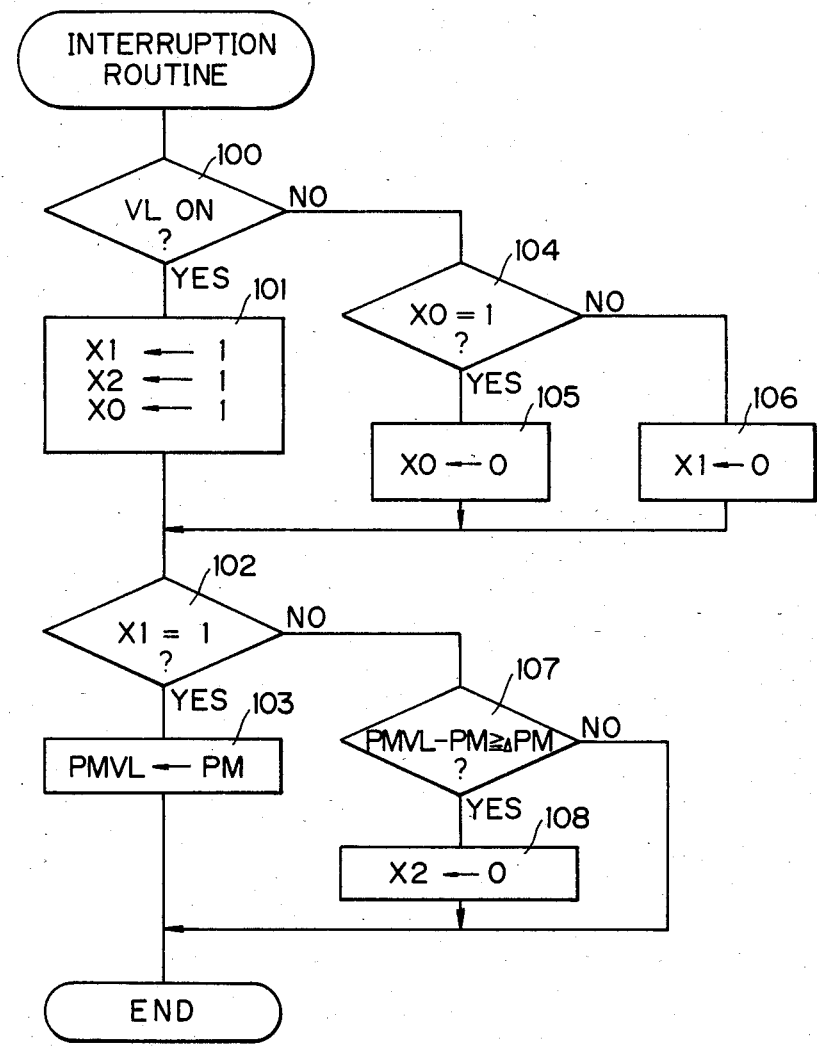
FIG. 9 is a flow chart for explaining the selective setting or resetting of the flags.

FIG. 9 illustrates a processing routine for setting the flags X1 and X2. This routine is processed by sequential interruptions executed at predetermined time intervals, for example, 12 msec. Referring to FIG. 9, initially, at step 100, it is determined whether the output signal VL of the fully open switch 28b indicates that the fully open switch 28b is ON. If the fully open switch 28b is ON, the routine goes to step 101. At step 101, 1 is put into the flags X1, X2, and X0, that is, the flags X1, X2, and X0 are set. The flag X0 is used for discriminating when the fully open switch 28b is made OFF. Then, at step 102, it is determined whether the flag X1 is set. At this time, since the flag X1 is set, the routine goes to step 103. At step 103, the absolute pressure PM in the surge tank 22 is put into the reference pressure PMVL, and the processing cycle is then completed. Consequently, when the fully open switch 28b is made ON, the flags X1, and X2 are set.

Then, when the fully open switch 28b is made OFF, the routine goes to step 104 from step 100. At step 104, it is determined whether the flag X0 is set. At this time, since the flag X0 is set, the routine goes to step 105. At step 105, the flag X0 is reset and the routine then goes to step 102. At this time, since the flag X1 is set, the routine goes to step 103, and the present absolute pressure PM is put into the reference pressure PMVL. The processing cycle is then completed.

In the next processing cycle, since the flag X0 is reset, the routine goes to step 106 from step 104. At step 106, the flag X1 is reset. Consequently, it will be understood that, when the fully open switch 28b is made OFF, the flag X1 is reset as illustrated in FIG. 8. The routine then goes to step 102. At this time, since the flag X1 is reset, the routine goes to step 107. Consequently, it will be understood that the reference pressure PMVL indicates the absolute pressure PM when the fully open switch 28b is made OFF as illustrated in FIG. 8.

At step 107, it is determined whether (the reference pressure PMVL—the present absolute pressure PM) is equal to or larger than a predetermined pressure $\Delta$PM, that is, the present absolute pressure PM decreases by the predetermined pressure $\Delta$PM. If the absolute pressure PM does not decrease by $\Delta$PM, the processing routine is completed. Contrary to this, if the absolute pressure PM decreases by $\Delta$PM, the routine goes to step 108, and the flag 2 is reset.

Figure 10:
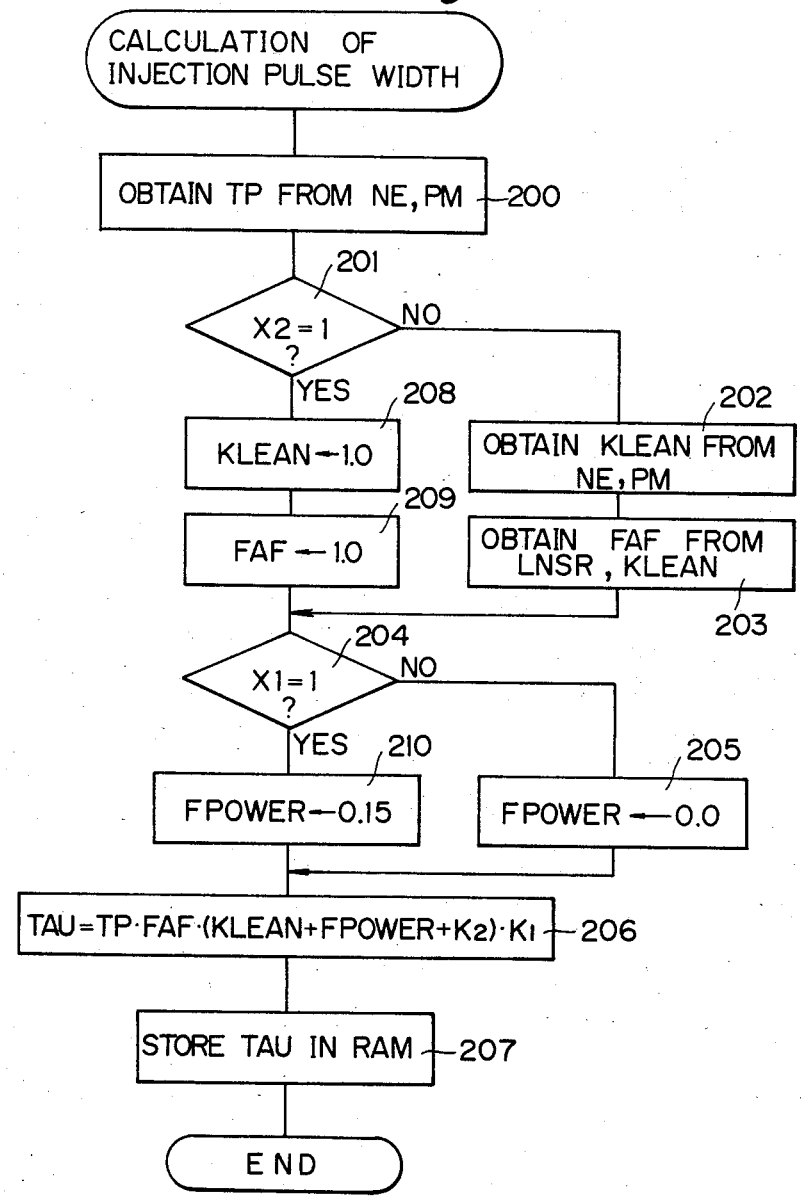
FIG. 10 is a flow chart for explaining the calculating of a fuel injection pulse width.
Figure 11:
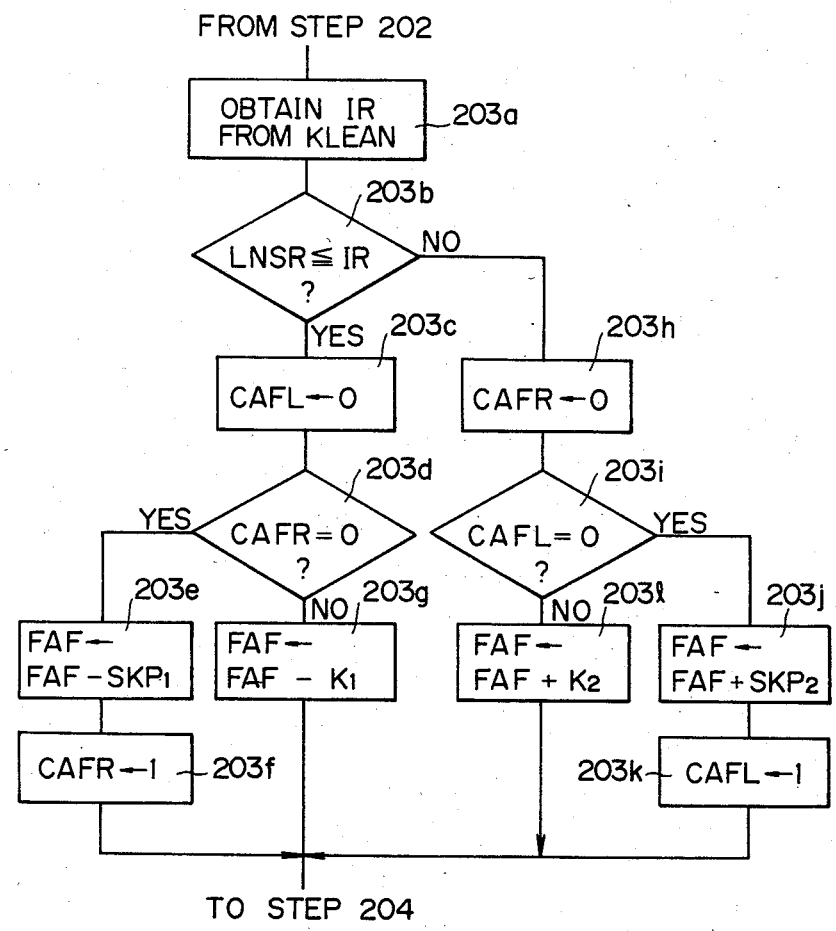
FIG. 11 is a flow chart for explaining the calculating of the correction coefficient FAF.
Figure 14:
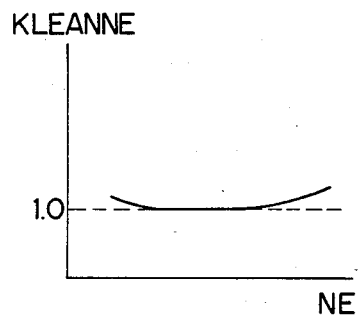
FIG. 14 is a diagram illustrating the relationship between a correction coefficient KLEANNE and the engine speed.
Figure 15:
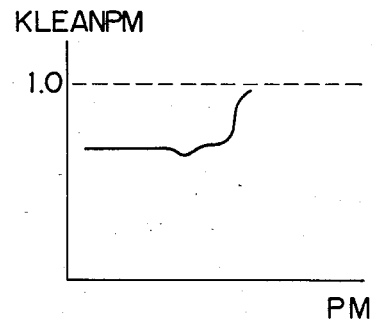
FIG. 15 is a diaphragm illustrating a relationship between a correction coefficient KLEANPM and the absolute pressure in the surge tank.

FIG. 10 illustrates a processing routine for calculating the pulse width TAU of the injection signal. This routine is executed in a main routine every time the crankshaft rotates by a predetermined angle, for example, 180 degrees. Referring to FIG. 11, at step 200, the basic pulse width TP of the injection signal is obtained from the engine speed NE and the absolute pressure PM. Data indicating the relationship among the basic pulse width TP, the engine speed NE, and the absolute pressure PM is stored in the ROM 53 in the form of a data table. Thus, at step 200, the basic pulse width TP is obtained from the data stored in the ROM 53. Then, at step 201, it is determined whether the flag X2 is set. If the flag X2 is reset, the routine goes to step 202, and KLEAN is obtained from the engine speed NE and the absolute pressure PM. That is, data indicating the relationship between KLEANNE and the engine speed NE as illustrated in FIG. 14 is stored in the ROM 53, and the data indicating the relationship between KLEANPM and the absolute pressure PM as illustrated in FIG. 15 is stored in the ROM 53. At step 202, KLEANNE is multiplied by KLEANPM, and thus KLEAN (=KLEANNE·KLEANPM) is obtained. This KLEAN is a correction coefficient used for changing the desired air-fuel ratio to an air-fuel ratio which is on the lean side of the stoichiometric air-fuel ratio. When the desired air-fuel ratio is the stoichiometric air-fuel ratio or an air-fuel ratio which is on the rich side of the stoichiometric air-fuel ratio, KLEAN is maintained at 1.0. The routine then goes to step 203. At step 203, FAF is obtained from the output value LNSR of the lean sensor 43 and the lean correction coefficient KLEAN. This FAF is a correction coefficient used for carrying out the closed loop control of the air-fuel ratio. When open loop control of the air-fuel ratio is carried out, FAF is maintained at 1.0. FIG. 11 illustrates an example of the processing executed in step 203 of FIG. 10.

Figure 16:
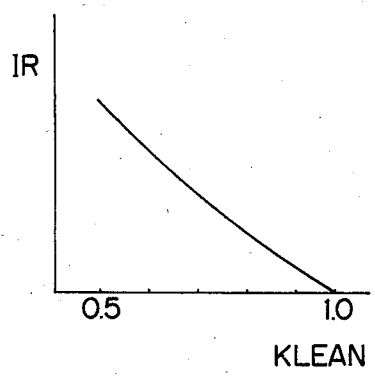
FIG. 16 is a diagram illustrating the relationship between the correction coefficient KLEAN and a reference current IR.

Referring to FIG. 11, initially, at the step 203a, a reference value IR is obtained from KLEAN. Data indicating the relationship between IR and KLEAN as illustrated in FIG. 16 is stored in the ROM 53. IR indicates the output value of the lean sensor 43, which corresponds to the desired lean air-fuel ratio represented by KLEAN. Consequently, by comparing the reference value IR with the actual output value of the lean sensor 43, it is possible to control the actual air-fuel ratio in such a manner that it becomes equal to the desired lean air-fuel ratio.

At step 203b, the output value of the lean sensor 43 is compared with the reference value IR representing the desired lean air-fuel ratio, that is, it is determined whether the actual air-fuel ratio is on the lean side or on the rich side of the desired lean air-fuel ratio. If LNSR$\leq$IR, that is, if the actual air-fuel ratio is on the rich side of the desired lean air-fuel mixture, the routine goes to step 203c. In step 203, the flag CAFL for the skip, which is used at step 203i, is reset. Then, at step 203d, it is determined whether the flag CAFL for the skip is reset. When the actual air-fuel ratio is changed from the lean side of the desired lean air-fuel ratio to the rich side, since the flag CAFR has been reset, the routine goes to step 203e. At step 203e, FAF is reduced by $SKP_1$. Then, at step 203f, the flag CAFR is set. Consequently, after this, when the routine goes to step 203d, it is determined that the flag CAFR is set and the routine goes to step 203g. At step 203g, FAF is reduced by $K_1$. $SKP_1$ and $K_1$ have a fixed value, and the value $SKP_1$ is considerably larger than that of $K_1$. That is, $SKP_1$ is used for instantaneously reducing FAF by a large value, that is, for carrying out the skip operation of FAF when the actual air-fuel ratio is changed from the lean side to the rich side of the desired lean air-fuel ratio. Contrary to this, $K_1$ is used for gradually reducing FAF, that is, for carrying out the integrating operation of FAF after the skip operation of FAF is completed.

If LNSR>IR, that is, when the actual air-fuel ratio is changed from the rich side to the lean side of the desired lean air-fuel ratio, the processing indicated by steps 203h through 203l is executed. The processing executed in steps 203h through 203l is almost the same as the processing executed in steps 203c through 203g, except that FAF is increased by $SKP_2$ and $K_2$. Consequently, the description regarding steps 203h through 203l is omitted.

Turning to FIG. 10, after FAF is obtained in step 203, the routine goes to step 204. At step 204, it is determined whether the flag X1 is set. When the flag X2 is reset, since the flag X1 is also reset, the routine goes to step 205. At step 205, 0.0 is put into the power correction coefficient FPOWER. This FPOWER is used for the enrichment of the mixture. The routine then goes to step 206.

At step 206, the actual pulse width TAU of the injection signal is calculated from the following equation by using the basic pulse width TP, the air-fuel ratio feedback correction coefficient FAF, the lean correction coefficient KLEAN, the power correction coefficient FPOWER, and the other correction coefficients $K_1$ and $K_2$.

$$TAU = TP \cdot FAF \cdot (KLEAN + FPOWER + K_2) \cdot K_1$$

Then, at step 207, the actual pulse width TAU is stored in the RAM 52. In the main routine processed by sequential interruptions executed at every predetermined crank angle, the injection start time and the injection stop time are obtained from the actual pulse width TAU, and the injection signal is output to the I/O port 54 between the injection start time and the injection stop time. As a result, fuel is injected from the fuel injector 24. At this time, the air-fuel ratio of the lean air-fuel mixture fed into the engine cylinders is controlled in such a manner that it becomes equal to the desired lean air-fuel ratio.

When the flag X2 is set, that is, when the fully open switch 28b is made ON, the routine goes from step 201 to step 208. At step 208, 1.0 is put into KLEAN and then, at step 209, 1.0 is put into FAF. The routine then goes to step 204. At this time, if the flag X1 is set, the routine goes to step 210, and 0.15 is put into FPOWER. Then, the actual pulse width TAU of the injection signal is calculated in step 206. At this time, the actual pulse width TAU is calculated by the following equation.

$$TAU = TP \cdot (1.15 + K_2) \cdot K_1$$

The basic pulse width TP indicates a pulse width which is necessary to form an air-fuel mixture of an approximately stoichiometric air-fuel ratio, and the actual pulse width TAU is larger than the basic pulse width TP. Consequently, when the flag X1 is set, a rich air-fuel mixture is fed into the engine cylinders as illustrated in FIG. 8.

Contrary to this, if the flag X1 is reset, the routine goes to from step 204 to step 205, and 0.0 is put into FPOWER. Then, at step 206, the actual pulse width TAU is calculated. At this time, the actual pulse width TAU is calculated by the following equation.

$$TAU = TP \cdot (1.0 + K_2) \cdot K_1$$

Consequently, when X2 is set and X1 is reset, the air-fuel mixture having an approximately stoichiometric air-fuel ratio is fed into the engine cylinders as illustrated in FIG. 10.

Figure 12:
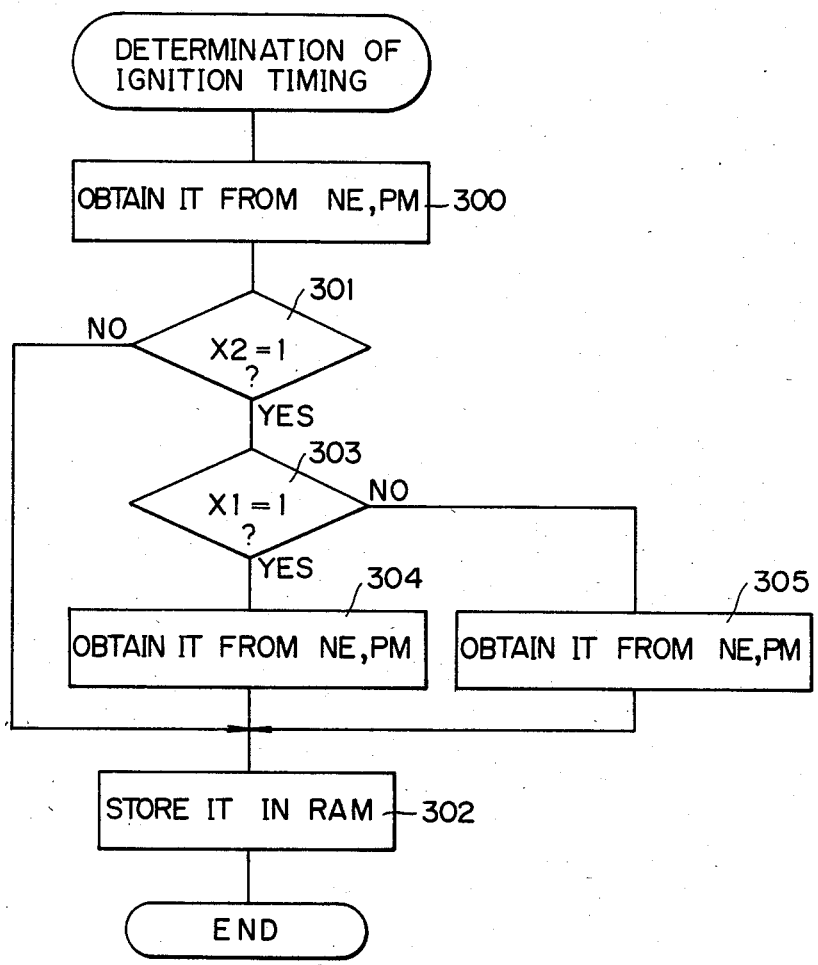
FIG. 12 is a flow chart for explaining the determination of the ignition timing.

FIG. 12 illustrates a processing routine for determining the ignition timing IT. This routine is executed in a main routine every time the crankshaft rotates by a predetermined angle, for example, 180 degrees. Referring to FIG. 12, at step 300, the ignition timing IT is obtained from the engine speed NE and the absolute pressure PM in the surge tank 22. The relationship among the ignition timing IT, the engine speed NE and the absolute pressure PM is stored in the first area of the ROM 53. This ignition timing IT is a basic ignition timing which is suitable for the lean air-fuel mixture. This basic ignition timing is the most advanced ignition timing and is, for example, 28 degrees before top dead center (TDC).

Then, at step 301, it is determined whether the flag X2 is set. If the flag X2 is reset, the routine jumps to step 302, and the ignition timing IT is stored in the RAM 52. Then, the ignition signal is fed into the ignitor 47, and the corresponding spark plug 6 produces a spark at a time determined by the ignition timing stored in the RAM 52.

If the flag X2 is set, the routine goes to step 303 from step 301, and it is determined whether the flag X1 is set. If the flag X1 is set, the routine goes to step 304, and the ignition timing IT is obtained from the engine speed NE and the absolute pressure PM. The relationship among the ignition timing IT, the engine speed NE, and the absolute pressure PM is stored in the second area of the ROM 53. This ignition timing IT is considerably retarded relative to the basic ignition timing and is, for example, 16 degrees before TDC. This ignition timing is suitable for the rich air-fuel mixture. Consequently, when the flag X1 is set, the ignition timing IT is considerably retarded as illustrated in FIG. 8.

If it is determined at step 303 that the flag X1 is reset, the routine goes to step 305, and the ignition timing IT is obtained from the engine speed NE and the absolute pressure PM. The relationship between the ignition timing IT, the engine speed NE, and the absolute pressure PM is stored in the third area of the ROM 53. This ignition timing IT is an intermediate timing between the basic ignition timing and the most retarded ignition timing used when the rich air-fuel mixture is fed into the engine cylinders. This intermediate ignition timing IT is, for example, 20 degrees before TDC, and is suitable for the air-fuel mixture having an approximately stoichiometric air-fuel ratio. Consequently, when the flag X2 is set and the flag X1 is reset, the ignition timing IT is advanced relative to the ignition timing used when the rich air-fuel mixture is fed into the engine cylinders as illustrated in FIG. 8.

Figure 13:
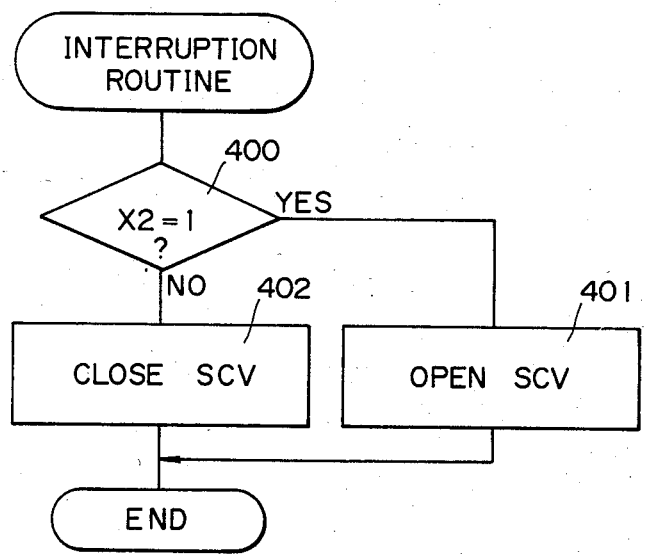
FIG. 13 is a flow chart for explaining the controlling of an opening operation of a swirl control valve.

FIG. 13 illustrates the processing routine for controlling the swirl control valve 17. This routine is processed by sequential interruptions executed at predetermined time intervals. Referring to FIG. 13, at step 400, it is judged whether the flag X2 is set. If the flag X2 is set, the routine goes to step 401. At step 401, the solenoid valve 39 is energized, and the vacuum chamber 34 of the actuator 31 is opened to the outside air. As a result, the swirl control valve (SCV) 17 is opened to the maximum extent. Contrary to this, if the flag X2 is reset, the routine goes to step 402, and the solenoid valve 39 is deenergized. As a result, the vacuum chamber 34 of the actuator 31 is connected to the surge tank 22, and thus the swirl control valve (SCV) 17 is closed.

When the degree of opening of the throttle valve 27 is small, a large vacuum is produced in the vacuum chamber 34 of the actuator 31, and thus the swirl control valve 17 closes the bypass passage 13. When the throttle valve 27 is further opened, the level of vacuum in the surge tank 22 becomes low. However, at this time, since the level of vacuum in the vacuum chamber 34 of the actuator 31 is maintained at the maximum vacuum produced in the surge tank 22, as mentioned previously, the swirl control valve 17 remains closed. At this time, if air in the surge tank 22 leaks into the vacuum chamber 34 and, as a result, the level of vacuum in the vacuum chamber 34 becomes low, since it is possible to maintain the swirl control valve 17 at the closed position by a relatively low vacuum, as mentioned previously, the swirl control valve 17 remains closed. When the throttle valve 27 is fully open, the vacuum chamber 34 of the actuator 31 is opened to the outside air, and thus the swirl control valve 17 opens the bypass passage 13 to the maximum extent. At this time, the rich air-fuel mixture is fed into the engine cylinders, and the ignition timing is considerably retarded.

After this when the throttle valve 27 is slightly closed, and thus the fully open switch 28b is made OFF, the air-fuel mixture fed into the engine cylinders is changed from the rich air-fuel mixture to the air-fuel mixture of an approximately stoichiometric air-fuel ratio, and the ignition timing is slightly advanced, but the swirl control valve 17 is maintained at the open position. At this time, if the vacuum chamber 34 of the actuator 31 is connected to the surge tank 22, and the lean air-fuel mixture is fed into the engine cylinders, since the level of vacuum in the surge tank 22 is low, the swirl control valve 17 does not close, and thus the combustion deteriorates. However, in the present invention, the air-fuel mixture of an approximately stoichiometric air-fuel ratio is fed into the engine cylinders, and the ignition timing is slightly advanced. Consequently, at this time, even if the swirl control valve 17 is maintained at the open position, it is possible to obtain a good combustion. Therefore, when the fully open switch 28b is made OFF, the output torque of the engine 1 does not abruptly decrease and it is possible to obtain a good drivability.

When the fully open switch 28b is made OFF, it is possible to construct a control device by which the rich air-fuel mixture continues to be fed into the engine cylinders. However, if the time $T_3$ illustrated in FIG. 8 is long, a problem occurs in that the fuel consumption is increased. Therefore, in the present invention, when the fully open switch 28b is made OFF, the air-fuel mixture of an approximately stoichiometric air-fuel ratio is fed into the engine cylinders in order to improve the fuel consumption.

In addition, in the present invention, the swirl control valve 17 closes shortly after the fully open switch 28b. Consequently, there is no danger that the swirl control valve 17 will repeatedly open and close when the fully open switch 28b is repeatedly made ON and OFF.

While the invention has been described by reference to a specific embodiment chosen for purposes of illustration, it should be apparent that numerous modifications could be made thereto by those skilled in the art without departing from the basic concept and scope of the invention.

We claim:

1. A control device of an internal combustion engine, comprising:
   an intake passage;
   a throttle valve arranged in said intake passage;
   switch means operated in response to the degree of opening of said throttle valve and producing an output signal representing a state wherein the degree of opening of said throttle valve is greater than a predetermined degree;
   a vacuum sensor arranged in said intake passage and producing an output signal representing the absolute pressure therein;
   discriminating means operated in response to the output signals of said switch means and said vacuum sensor for discriminating whether said absolute pressure decreases by a predetermined pressure after the degree of opening of said throttle valve becomes smaller than said predetermined degree to produce an output signal representing a state wherein said absolute pressure decreases by said predetermined pressure after the degree of opening of said throttle valve becomes smaller than said predetermined degree;
   a swirl control valve arranged in said intake passage for creating a swirl motion in a combustion chamber when said swirl control valve is closed;
   valve control means actuating said swirl control valve in response to the output signals of said switch means and said discriminating means for opening said swirl control valve when the degree of opening of said throttle valve exceeds said predetermined degree and for closing said swirl control valve when said absolute pressure decreases by said predetermined pressure after the degree of opening of said throttle valve becomes smaller than said predetermined degree;
   fuel supply means arranged in said intake passage for normally forming a lean air-fuel mixture therein;
   fuel supply control means controlling said fuel supply means in response to the output signals of said switch means and said discriminating means for forming a rich air-fuel mixture in said intake passage when the degree of opening of said throttle valve exceeds said predetermined degree and for forming in said intake passage an air-fuel mixture having an intermediate air-fuel ratio between an air-fuel ratio of said lean air-fuel mixture and an air-fuel ratio of said rich air-fuel mixture until the time said absolute pressure decreases by said predetermined pressure after the degree of opening of said throttle valve becomes smaller than said predetermined degree;
   a spark plug arranged in said combustion chamber and normally producing a spark at a predetermined basic ignition timing; and,
   ignition timing control means controlling the ignition timing of said spark plug in response to the output signals of said switch means and said discriminating means for retarding the ignition timing when the degree of opening of said throttle valve exceeds said predetermined degree and for changing the ignition timing to an intermediate ignition timing between said basic ignition timing and said retarded ignition timing until the time said absolute pressure decreases by said predetermined pressure after the degree of opening of said throttle valve becomes smaller than said predetermined degree.

2. A control device according to claim 1, wherein said switch means produces said output signal when said throttle valve is fully open.

3. A control device according to claim 1, wherein said predetermined pressure is determined based on said absolute pressure produced at a moment when the degree of opening of said throttle valve is smaller than said predetermined degree.

4. A control device according to claim 3, wherein said predetermined pressure is determined by subtracting a fixed value from said absolute pressure produced at said moment.

5. A control device according to claim 1, wherein said intake passage has a helically-shaped intake port comprising a helical portion, a substantially straight extending inlet passage portion tangentially connected to said helical portion, and a bypass passage branched from said inlet passage portion and connected to a helix terminating portion of said helical portion, said swirl control valve being arranged in said bypass passage.

6. A control device according to claim 5, wherein said intake port has a separating wall projecting downward from an upper wall of said intake port and extending along an axis of said intake port, said separating wall defining said helical portion, said inlet passage portion, and said bypass passage.

7. A control device according to claim 1, wherein said valve control means comprises an actuator having a vacuum chamber isolated from the outside air by a diaphragm which is connected to said swirl control valve, and a valve device arranged between said intake passage and said vacuum chamber for confining vacuum in said vacuum chamber to close said swirl control valve and for causing said vacuum chamber to open to the outside air to open said swirl control valve.

8. A control device according to claim 7, wherein said valve device comprises a check valve arranged between said vacuum chamber and said intake passage and permitting only the outflow of air from said vacuum chamber to said intake passage, and a solenoid valve connected to said vacuum chamber and being able to open to the outside air for causing said vacuum chamber to open to the outside air.

9. A control device according to claim 8, wherein said vacuum chamber is connected to said intake passage via a single conduit, and said check valve and said solenoid valve are arranged in said conduit.

10. A control device according to claim 1, wherein said intermediate air-fuel ratio is an approximately stoichiometric air-fuel ratio.

11. A control device according to claim 1, further comprising an engine speed sensor producing an output signal representing the engine speed, said intermediate air-fuel ratio and an air-fuel ratio of said rich air-fuel mixture being determined based on the output signals of said vacuum sensor and said engine speed sensor.

12. A control device according to claim 11, further comprising a memory storing the relationship among said engine speed, said absolute pressure and a basic injection pulse width.

13. A control device according to claim 1, further comprising a lean switch connected to said throttle valve and producing an output signal which indicates whether the degree of opening of said throttle valve is larger than a fixed degree which is smaller than said predetermined degree for forming a relatively lean air-fuel mixture or an extremely lean air-fuel mixture which is leaner than said relatively lean air-fuel mixture when the degree of opening of said throttle valve is larger or smaller than said fixed degree, respectively.

14. A control device according to claim 1, further comprising a lean sensor arranged in an exhaust passage of said engine and detecting an air-fuel ratio, an air-fuel ratio of the lean air-fuel mixture being controlled in response to an output signal of said lean sensor so that it becomes equal to a desired lean air-fuel ratio.

15. A control device according to claim 1, further comprising an engine speed sensor producing an output signal representing the engine speed, said basic ignition timing, said retarded ignition timing and said intermediate ignition timing being determined based on the output signals of said vacuum sensor and said engine speed sensor.

16. A control device according to claim 15, further comprising a memory storing the relationships among said basic ignition timing, said engine speed and said absolute pressure, among said retarded ignition timing, said engine speed and said absolute pressure, and among the intermediate ignition timing, said engine speed and said absolute pressure.

* * * * *